US006508397B1

(12) United States Patent
Do

(10) Patent No.: US 6,508,397 B1
(45) Date of Patent: Jan. 21, 2003

(54) SELF-DEFENSE ATM

(75) Inventor: Cuong D. Do, Woodland Hills, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/280,583

(22) Filed: Mar. 30, 1999

Related U.S. Application Data

(60) Provisional application No. 60/079,800, filed on Mar. 30, 1998.

(51) Int. Cl.[7] .......................... G06F 17/60
(52) U.S. Cl. .......................... 235/379; 902/1
(58) Field of Search .......................... 235/379, 380–382.5; 902/1–21; 705/43, 39, 44

(56) References Cited

U.S. PATENT DOCUMENTS 3,683,536 A * 8/1972 Sefried, II .......... 42/62
3,792,885 A * 2/1974 Giardina et al. .......... 292/39
4,134,537 A * 1/1979 Glaser et al. .......... 235/379
4,420,751 A * 12/1983 Paganini et al. .......... 340/825.33
4,442,346 A * 4/1984 Bosinger et al. .......... 235/379
4,489,663 A * 12/1984 Poag et al. .......... 109/76
4,700,869 A * 10/1987 Bogner .......... 221/229
5,257,581 A * 11/1993 Welling .......... 109/24
5,451,757 A * 9/1995 Heath, Jr. .......... 235/382
5,509,700 A * 4/1996 Kennedy, Jr. .......... 292/3
5,726,430 A * 3/1998 Ruggirello .......... 235/379
5,780,825 A * 7/1998 Sato et al. .......... 235/379
5,907,286 A * 5/1999 Kuma .......... 340/825.31
5,984,177 A * 11/1999 Do et al. .......... 235/379
6,000,348 A * 12/1999 Do .......... 109/59
6,028,626 A * 2/2000 Aviv .......... 348/152
6,082,616 A * 7/2000 Lewis et al. .......... 235/379

FOREIGN PATENT DOCUMENTS

GB 2093905 * 9/1982
GB 2146689 * 4/1985

* cited by examiner

*Primary Examiner*—Michael G. Lee
*Assistant Examiner*—Jamara A. Franklin
(74) *Attorney, Agent, or Firm*—George T. Marcou; Kilpatrick Stockton LLP

(57) ABSTRACT

An enhanced-security automated bank teller machine/customer activated teller (ATM/CAT). The ATM/CAT includes a multi-level security system. The first line of defense is access control to the service area behind the ATM/CAT through the use of an electronic lock on the service area door with an emergency override, which is only operable during non-curfew hours. The second line of defense is a passive infrared (PIR) detector in the service area, and lights and a loudspeaker to deter theft. The third line of defense is an impact sensor panel covering the security chest, which can be cheaply replaced. The fourth line of defense is the steel or composite material security chest and boltwork, which locks so that the door cannot open if the hinge is removed. Furthermore, the location of the lock, the latching bars, and the hinges cannot be ascertained from the outside of the security chest. The fifth line of defense is a glass plate to jam the boltwork closed if an attacker drills through the chest door.

63 Claims, 5 Drawing Sheets

ATM/CAT TERMINAL

SELF-DEFENSE ATM

This application claims priority to applicant's provisional application entitled "SELF-DEFENSE ATM" having U.S. Ser. No. 60/079,800 filed Mar. 30, 1998.

FIELD OF THE INVENTION

The present invention relates to an advanced security system for automatic bank teller machines (ATMs), and more particularly to a method and apparatus for securing currency, deposits, and other items of value.

BACKGROUND

As automated bank teller machines/customer activated terminals (ATMs/CATs) become more and more widely used, they are increasingly becoming the target of burglaries. Current security mechanisms are insufficient to deter theft, as criminals are becoming more sophisticated.

ATMs/CATs typically contain a security chest that houses currency, deposits, transaction records, and various electronic components of the machine. These security chests are typically designed to prevent a burglar from entering within fifteen minutes using tools such as wedges, pneumatic devices, hammers, and bolt cutters. This is the minimal standard of security required in the United States; however, higher standards of security are required in Canada, Europe, and other countries.

The lowest level of security deters entry using tools, but does not necessarily deter an attack using heat. For example, an automated security chest could provide ample protection against hammers and wedges, but succumb to a blow torch attack in seconds. The next level security is to provide sufficient protection to deter both tool and heat attacks for at least fifteen minutes.

These higher security measures have not been widely used in the United States due to increased costs in both manufacturing, installation, and operation; however, as theft increases and criminals become more skilled in compromising the security of automated bank teller machines, it is becoming more and more important to increase security without significantly increasing costs of manufacture, installation, or operation of the device.

There is therefore a need for an increased security ATM/CAT device with increased security.

SUMMARY OF THE INVENTION

Advantages of the present invention are to provide an automatic bank teller machine with increased security to deter theft; to maximize the level of personal safety for customers, employees, and contracted service-provider personnel; to deter attempts at physical attacks on the ATM/CAT security chest; to deter attempts at hostage-taking in an attempt to gain access to the security chest; to reduce the likelihood of successfully completing a physical attack on the security chest; to simplify the day-to-day operations, such as opening and closing of the security chest by authorized personnel; and to minimize the damage resulting from unsuccessful attacks.

The present invention takes advantage of technological advances in several areas of security (electronics and mechanics) to provide improved security with minimal impact on branch operations and ATM/CAT installation requirements to meet the goal of providing a higher level of security than any current automated teller machine either currently provides, or is expected to provide anytime soon.

Additional objects, advantages and novel features of the invention will be set forth in part in the description that follows, and in part will become more apparent to those skilled in the art upon examination of the following or upon learning by practice of the invention.

DETAILED DESCRIPTION

Figure 1:
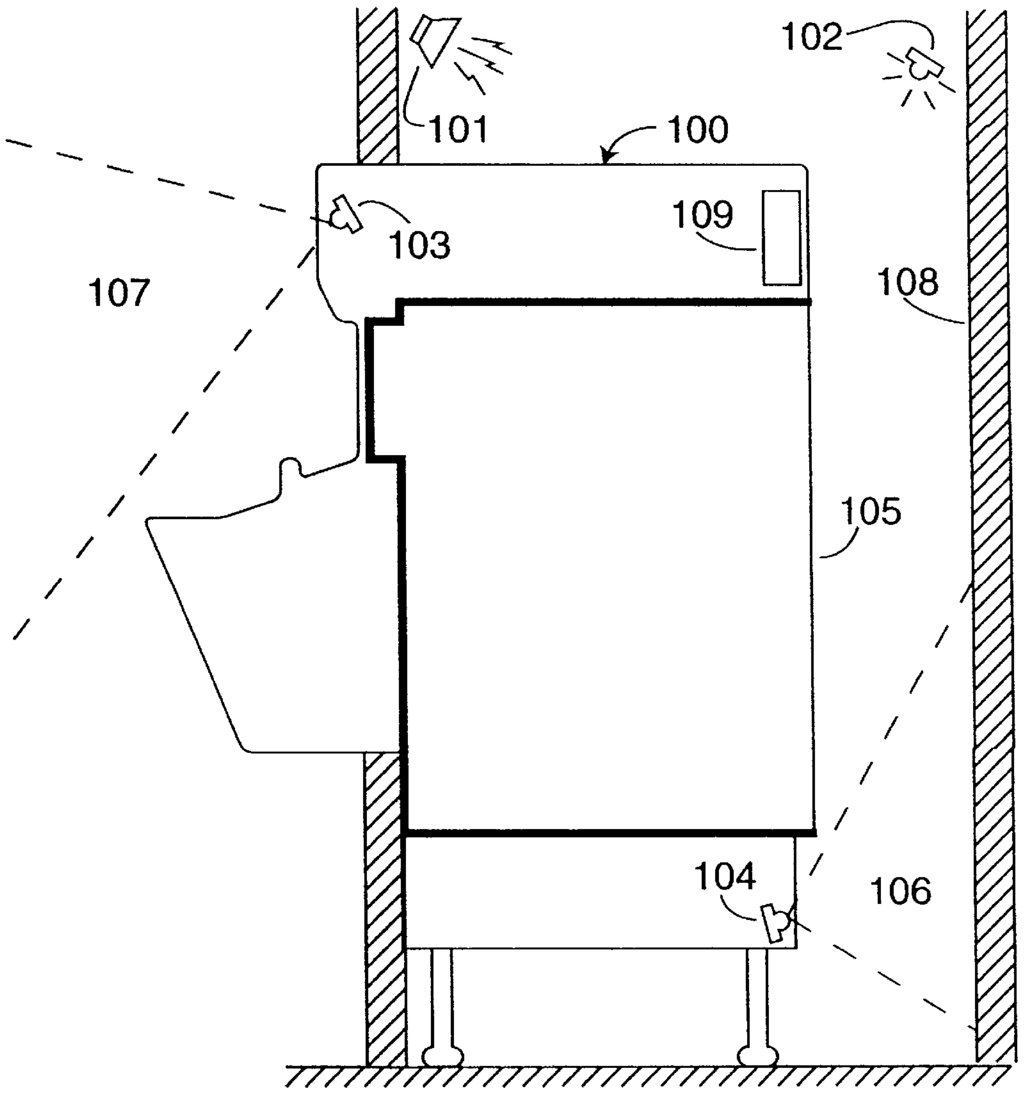
FIG. 1 depicts a system according to an embodiment of the present invention for an enhanced security ATM/CAT.

The present invention describes an advanced security ATM/CAT. Various embodiments of this invention include some or all of the following components: a security chest 100, a door member 105, a boltwork module, an electronic lock 409, a security controller module 501, an ATM/CAT controller 502, and a maintenance panel 105.

We begin by describing the security chest 100. In one embodiment of the present invention, the body (including the door 105) of the security chest 100 is made of high-strength abrasion-resistant steel, with wall thickness of 0.5 inches. This is the standard material currently used for security chests. By varying the thickness of the walls, the degree of protection can be changed. For example, an ATM/CAT with a wall thickness of 0.1 inches would be much easier to compromise than an ATM/CAT with a wall thickness of 1.5 inches; however, the thickness of the walls greatly influences the weight of the ATM/CAT. If weight is a factor, a thinner wall may be used; however, the tradeoff between weight and security must be considered.

In another embodiment of the present invention, the security chest 100, including the chest body and door 105, is made of a composite material. Composite materials provide the advantage of being lighter, yet providing protection against intrusion comparable to that of steel. Additionally, composite materials provide protection against heat-producing tools such as blow torches. One disadvantage of composite materials is the cost relative to steel.

In yet another embodiment, a combination of steel and composite material is used to balance the increased protection of composite materials with the lower cost of steel. For example, a security chest with 0.5 inches of steel and 0.5 inches of composite material provides increased protection with the full cost of making a security chest out of entirely composite materials.

As shown in FIG. 1, one of skill in the art would appreciate that the walls of the security chest 100, including the door 105, may be made to varying thicknesses. The thicknesses listed are merely representative of those found to provide the desired tradeoff between weight, security, and cost for purposes of the present invention. In other embodiments of the present invention, it may be desirable to significantly increase the size of the walls. For example, a bank vault implementing the security measures of the present invention may use walls which are twelve inches thick or more because the desire for stronger security is greater and the cost and weight are less important.

The security chest body 100 of one embodiement of the present invention complies with Underwriters Laboratories (UL) #291 and meets the UL TL-15 standard. This is also called Level 1 protection. The TL-15 standard means that the chest will not be successfully attacked in less than 15 minutes, using tools (but not a blow torch or other heat producing device).

The composite-material security chest body 100 of another embodiment of the present invention, complies with the UL TLTR-15 standard, meaning that this chest can not be successfully attacked in less than 15 minutes, with either tools or a torch. This is also referred to as Level II protection. The Canadian government has already established Level II protection as the minimum level of protection required of ATMs/CATs, and it is expected that the U.S. government will follow this lead. The present invention also calls for the composite material security chest to comply with even more stringent European security standards.

In one embodiment, the composite-material security chest body 100 has a wall thickness of between 1.0 inch and 1.5 inches. The composite material is less dense than steel. Therefore, the overall weight of the ATM remains about the same as the steel version.

In this embodiment, the composite material used consists of 3 elements: Ellox material, Aluminum Oxide Pellets, and an Elastomeric Alloy. Ellox material is a polymer modified from a semi-crystalline polyester and methyl esters of higher alcohol. VALOX, a material sold by General Electric, is a suitable source for semi-crystalline polyester in both the polybutylene terepthalate and the polyethylene terepthalate forms. ALOX is a commercially available source for a series of methyl esters of higher alcohol.

Ellox has the highest density of impact (90,000 PSI vs. 100,000 PSI for steel). Aluminum Oxide Pellet is the hardest metal usually used to produce drilling bits. In one embodiment of the present invention, Aluminum Oxide is used in chip form, and mixed with the Ellox composite for chest body construction. An Elastomeric Alloy is a thermal plastic which is a grade flame retardant. It has a high temperature melting point (450 degrees C.) and very high impact resistance when crystallized. The Elastomer Alloy acts as a bonding agent to hold Ellox and Aluminum Oxide chips together, and for condensing the materials into one solid composite to resist torch, drilling, grinding, or impacting by hammer.

In one embodiment, the door 105 of the security chest is made of high-strength abrasion-resistant steel, as described earlier for the security chest body 100. The wall thickness for this embodiment is 0.5 inches. In another embodiment, composite material is used for the security chest door 105. In either the steel or composite-material embodiments, the security chest door 105 has a number of additional features as described below.

Figure 4A:
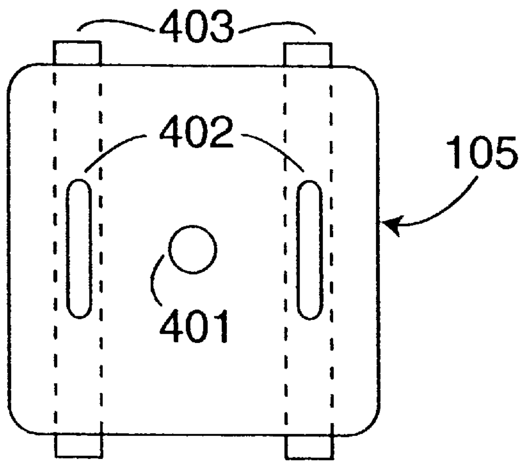
FIGS. 4A, 4B, and 4C depict a front, side, and expanded side perspective respectively of the security chest door according to an embodiment of the present invention.
Figure 4B:
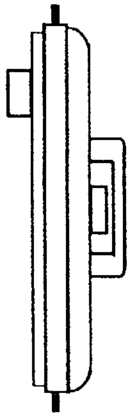
Figure 4C:
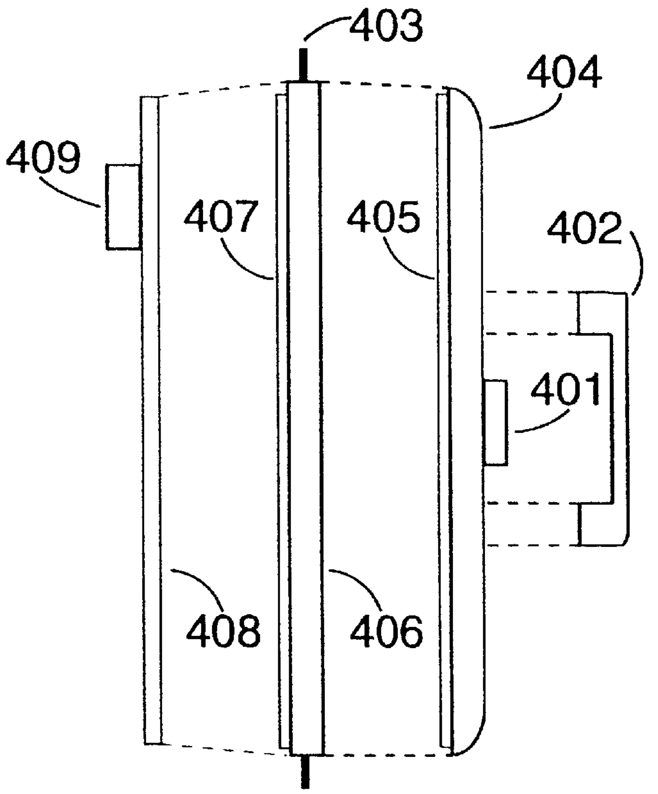
Figure 5:
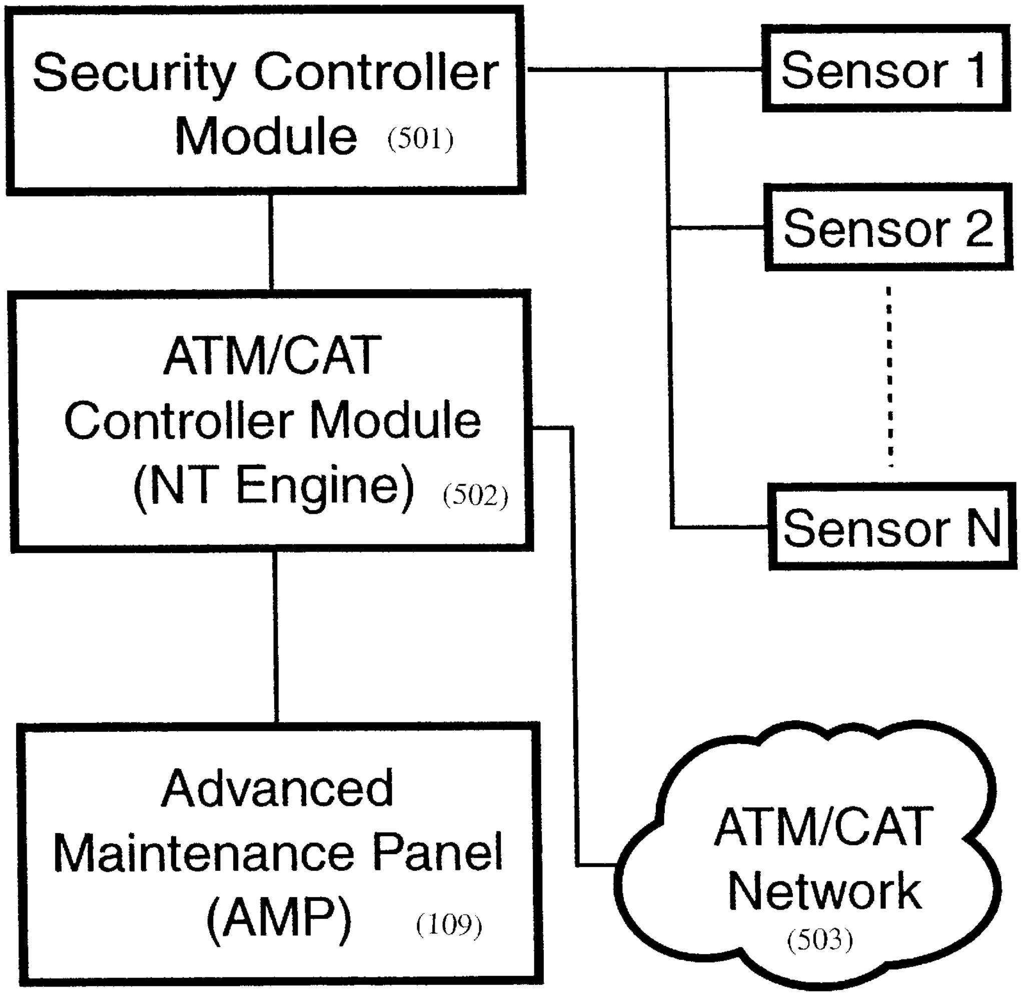
FIG. 5 depicts a block diagram according to an embodiment of the present invention.

FIG. 4A depicts a front view of door 105 with latching bars 403 protruding out of the top and bottom. The front of the door includes two handles 402 and a dial 401 which is discussed further below. FIG. 4B depicts a side view of door 105 and FIG. 4C depicts an expanded side view of the door 105 to better show the components and construction of one embodiment of the present invention. The door 105 is shown in FIG. 4C with three main components separated. The innermost component includes a glass plate 408 and an electronic lock 409. The next component includes the latching bars 403, the chest door plate 406, and inner door components 407. The last component includes outer door components 405, plastic panel 404, door handles 402, and a dial 401.

In one embodiment of the present invention, the inner door components 407 include the Security Controller Module 501, a door open/close sensor, a bolt lock sensor, a thermal sensor, and a seismic sensor. One of skill in the art would readily appreciate many variations and modifications including the addition of sensors which will become available in the future.

In another embodiment, the outer door components 405 includes an impact detection sensor. In other embodiments, any of the following sensors could be used: a door open/close sensor, a bolt lock sensor, a thermal sensor, a seismic sensor, or a photo sensor.

One unique feature of the present invention is the use of vertical bars 403 that serve as latching bars to latch the door 105 into the closed position. These bars 403, and associated mechanisms used to activate these bars are referred to as the boltwork. One bar extends along the left vertical edge at the side of the door, while the other bar is located in a similar fashion on the right side of the door. The two bars 403 latch at both the top and the bottom of the door, and thus there are four points at which the door is latched. Since both sides of the door 105 are actively latched, the door 105 cannot be removed, even if the hinge is removed entirely. Each of these two bars 403 is much stronger than the latch mechanism used on current security chests.

In another embodiment of the present invention, the two latching bars 403 are placed along the top horizontal side and the bottom horizontal side of the door 105 so that both sides of the door 105 are actively latched. In yet another embodiment, four latching bars are used, with one bar along each side of the door 105 so that all four sides are actively latched.

In an emboidment of the present invention, movement of the latching bars 403 is controlled by, for example, the branch person who is opening or closing the chest door 105. A manually-operated control dial 401, located in the center of the door, is rotated 90 degrees left to unlatch the latching bars 403 (when unlocking the door 105), or rotated 90 degrees right to latch the latching bars 403 (when locking the door 105). The control dial 401 is only allowed to be turned into the unlocked position when it is enabled by an internal electronic lock 409, described below. To discourage attack on the control dial 401, the control dial 401 has no markings. There is also nothing that would indicate that the control dial could be used for entry of a combination.

The symmetrical design of the boltwork, as well as the unique hinge design, allow for re-positioning of the door hinge to the opposite side of the chest. Some businesses may want to hinge the door from the left side, instead of the standard right side of the chest. This changeover can be implemented at the assembly facility, at a maintenance depot, or at the ATM/CAT installation site.

In a embodiment of the present invention, two handles 402 are provided on the door 105 of the security chest 100. A branch person must hold both handles 402 while opening or closing the chest door 105. This forces both hands to be clear of the edges of the door 105, minimizing risk of any door closing related injury to the branch person.

Figure 2A:
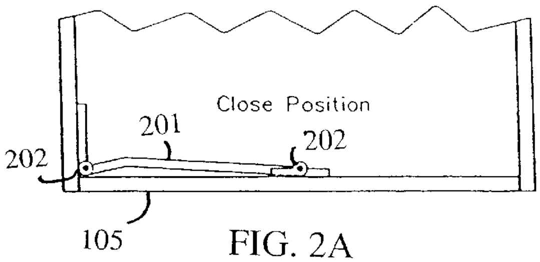
FIG. 2 is a perspective view of the door of ATM/CAT in accordance with an embodiment of the present invention.
Figure 2D:
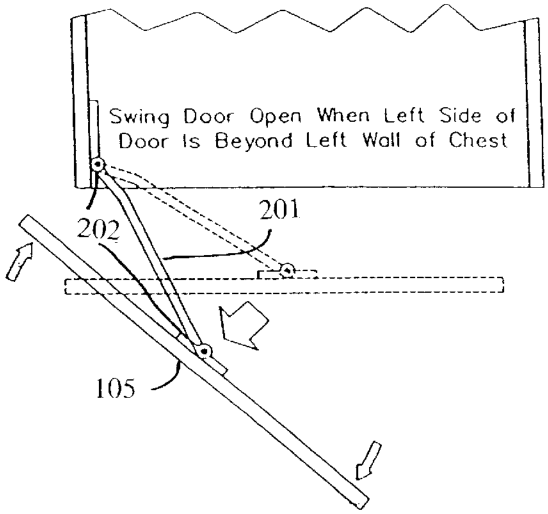
Figure 2B:
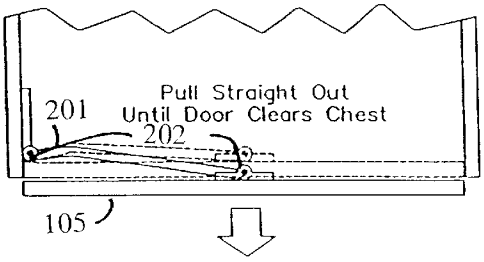
Figure 2E:
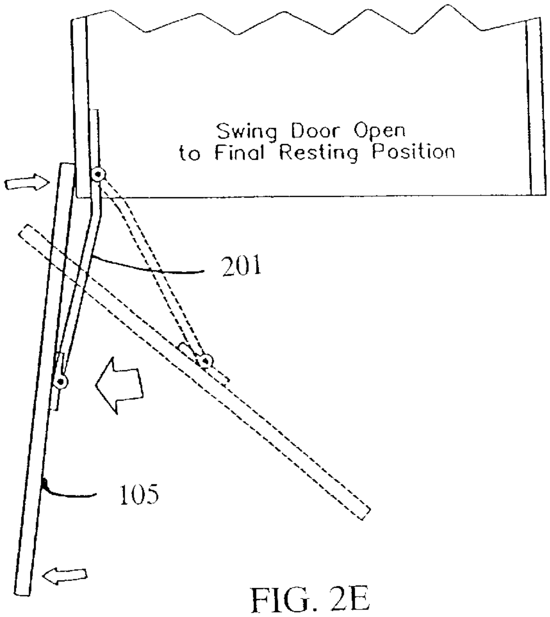
Figure 2C:
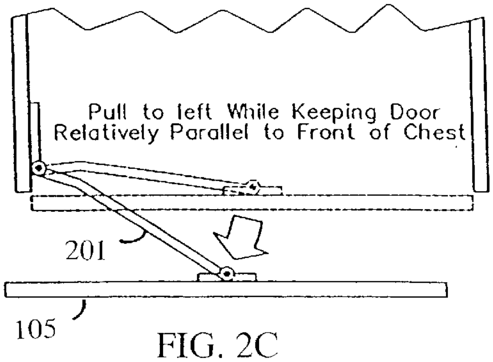

The chest door 105 of an embodiment of the present invention is mounted on hinges 201 that are hidden from view. The location of the hinge 201 cannot be determined from outside the chest 201, and the hinge 201 therefore does not present itself as a point of attack. The operation of the hinge 201 is shown by FIG. 2. The hinge 201 operates by the branch person pulling the door out (FIG. 2B) and away from the chest about 3 inches (FIG. 2C), and then rotating the door all the way open (FIGS. 2D and 2E).

The hinge 201 of this embodiment, referred to as a crane hinge, has two hinge points 202, which allows for added flexibility for door 105 extension when fully opened compared to a conventional security chest door. The door 105 does not have to extend as far beyond the right side of the ATM/CAT, when the door is fully opened, as a conventional security chest door.

In this embodiment, the door 105 is opened by first pulling the door 105 straight out, with one hand on each of the two handles 402. After the door 105 is pulled out about 3 inches, the door 105 is rotated open, just as a conventional door is opened. To close the door 105, this process is reversed. Refer to FIG. 2 for a description of the door motion.

The impact sensor panel 404 is an easily-replaceable plastic panel that is mounted over the steel or composite door 406 of the security chest. The panel 404 is ideally made of thin plastic or other relatively inexpensive material. This panel 404 covers a number of impact detection sensors 405, which are not visible, which cannot be located from outside the security chest. Any impact on this door 105 that is so intense that the impact could be an attack on the chest results in an alarm condition being triggered. Low-intensity impacts, such as may occur when a video cassette is inadvertently struck against the chest door 105, will not cause an alarm condition.

If an attack occurs that damages the panel 404, only a minor expense incurs for replacing the plastic panel 404 and sensors 405. This replacement then brings the security chest 100 back to a like-new level of appearance and security.

An embodiment of the present invention includes a glass plate 408 installed across the inside surface of the security chest door 105. The glass plate 408 is connected to a series of spring-loaded links, which are in turn connected to the latching bars 403 on the security chest door 105. If the glass plate 408 is broken, as, for example, would occur in the process of drilling through the door 105, the latching bars 403 become jammed in the closed position, preventing the door 105 from opening.

Another feature of the ATM/CAT security system of the present invention is the use of an electronic lock 409 to lock and unlock the door 105 of the security chest 100. The unlocking of the door 105 does not use the traditional method of entering a combination on a dial that is exposed on the outside of the chest door. Instead, an electronic lock 409, which is not visible form the outside of the chest, is used to unlock the door. This electronic lock 409 is mounted on the inside of the door, and its exact position on the door cannot be determined from outside the door.

This electronic lock 409 is controlled by an Advanced Maintenance Panel 109 (AMP), described below. The electronic code provided from the AMP 109 is tested by the electronic lock 409 to determine if the combination is correct. If it is correct, the electronic lock 409 releases a bolt, allowing the door's latching bars 403 to be manually moved to the open position. The person opening the chest moves these latching bars 403 by rotating an unmarked control dial 401 one-half turn to the left.

An attacker can not determine the precise location of the electronic lock 409 from outside of the security chest 100. The electronic lock 409 is installed in one of eight possible locations. The exact location is selected at random by the person who assembles the electronic lock 409 to the door, when the security chest is first constructed. No record is kept of the exact mounting location of the lock on that particular security chest. Since the exact location is not known, an attacker trying to drill out the lock has only a one-in-eight chance of "finding" the lock on the first drilling attempt. Conversely, the attacker has a seven-in-eight chance of drilling through the glass 408, releasing the spring mechanism jamming the latching bars 403 in the closed position.

In another embodiment of the present invention, the lock 409 has a secondary input connection, which is concealed at the bottom of the safe. It is possible that an attack may be made on the interface cable connecting the AMP 109 to the electronic lock 409 assembly on the inside of the security chest door, such that this cable is no longer usable. In such a case, the secondary interface, hidden from view, is used to send the combination to the electronic lock. Upon entry of the correct combination in this manner, the electronic lock 409 is activated, such that the control dial 401 could be turned to disengage the latching bars 403.

One disadvantage of this embodiment is that personnel located on bank premises must have knowledge of the combination to the electronic lock 409. This potentially places employees at risk; for example, an attacker could resort to violence or take someone hostage in an attempt to obtain the combination from a bank employee. The next embodiment addresses some of these risks.

In this embodiment of the present invention, the combination of the electronic lock 409 is not entered directly, but instead the lock's correct combination is transmitted to the lock via the ATM/CAT network 503. To open the security chest door 105, bank personnel must request that the combination be sent to the electronic lock 409. In one embodiment, the request is made over the telephone, and in another embodiment, the request is made through the AMP 109 across the ATM/CAT network 503.

With this enhancement to the lock 409, the branch person would have to independently obtain the correct combination. This would be done by placing a telephone call to a lock-combination-maintenance facility, and, after following appropriate security protocols, obtaining the combination. The AMP 109 would not accept any password, and the network 503 would not accept any request for combination during curfew hours.

In the telephone-request embodiment, bank personnel call the lock-combination-maintenance facility to request that the appropriate combination be sent to the electronic lock 409. Traditional security protocols are used to authenticate the bank personnel. For example, the bank personnel would give some information identifying them, information identifying the ATM/CAT, and any other appropriate details. The lock-combination-maintenance facility operator then asks additional questions to verify the identify of the employee. If the authentication is successful, the combination is sent across the network 503 to the ATM/CAT electronic lock 409.

The information given to identify the employee could be, for example, an arbitrary number created for the purpose of authentication, an employee identification number, a social security number, the employee's name. If this information is accepted, the lock-combination-maintenance facility operator asks a question to verify the identify of the person. For example, the operator may ask for the employee's mother's maiden name, the employee's birth date, or any other piece of information that the employee would be expected to know.

Using a security system as described above, a hostage-alarm protocol could easily be implemented in another embodiment. For example, a codeword signifying a hostage situation could be given, thus alerting the lock-combination-maintenance facility. The operator could then notify law enforcement personnel who could respond quietly without alerting the attacker.

In an embodiment of the present invention, the request to download the correct combination to the lock 409 could only occur after the branch person has entered the correct chest-lock-combination-entry password on the AMP 109.

The combination obtained would be valid for the lock 409 of the particular ATM/CAT for which access is being requested. A security protocol similar to that used on remotely-located state lottery terminals is used to prevent fraud in which a simulated terminal is used to obtain a lock combination. The combination obtained is valid just long enough for the branch person to open the security chest following the phone call. After that, the lock 409 looses the data for the correct combination. This feature makes any attempt to learn the combination by monitoring the data sent form the keypad to the lock useless.

The present invention calls for the AMP 109 to be the primary security interface to the ATM/CAT for branch personnel. The AMP 109 is located on the top of the ATM/CAT security chest and positioned for access from the rear of the ATM/CAT. In addition to performing all of the functions currently performed by the Intelligent Maintenance Panel (IMP) traditionally used on ATMs/CATs, the AMP 109 also serves as the input device for branch personnel to access the security chest.

The use of the AMP 109 to enter the lock combination provides a level of security, in that a potential attacker would not see any sign of a dial, keypad, or any other such lock combination entry device on the door of the security chest. The AMP 109 is mounted above the chest with a concealed connection made to the chest.

Figure 3:
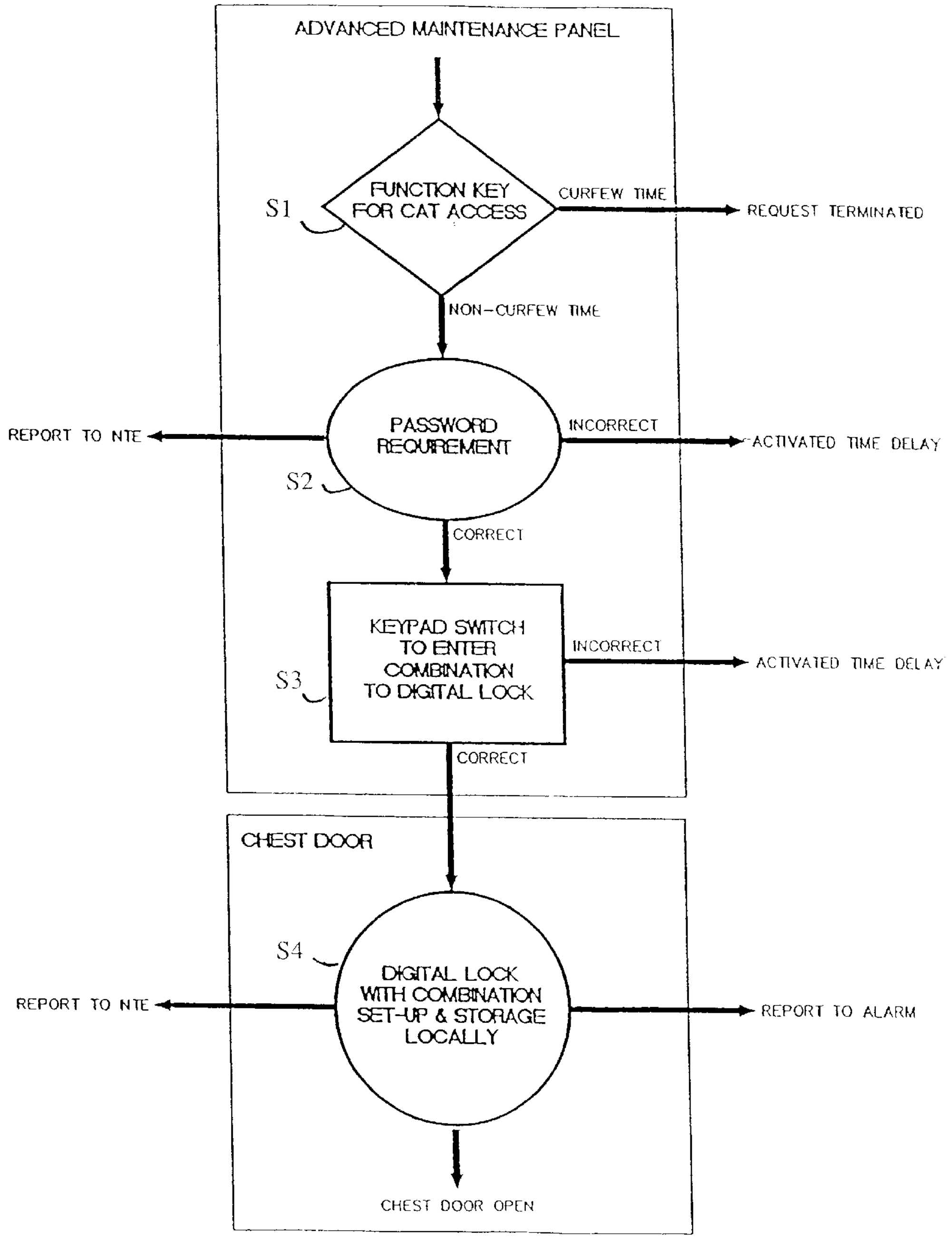
FIG. 3 is a flow chart showing the operation of the digital keylock according to an embodiment of the present invention.

In one embodiment of the present invention, the AMP 109 includes a high resolution LCD flat panel display screen and a numeric data entry keypad. To access the security chest, branch personnel follow an access sequence, as summarized in FIG. 3, and explained in detail below.

The AMP 109 displays a Branch-Personnel-Welcome screen while waiting for someone to approach and access the device. A menu screen, which is always present on the LCD display during the Branch-Personnel-Welcome screen, allows branch personnel to select a SECURITY CHEST ACCESS function. Selecting this function S1causes an initial test of the date and time to be made, to determine if the request is being made during a time period during which access to the security chest is allowed. If the request is being made during a "curfew time", the request is immediately denied, a message indicating "CURFEW IN EFFECT—ACCESS RESTRICTED" is presented on the AMP display, and an alert is presented to the ATM/CAT Controller Module 502 (also known as the NT Engine) within the ATM/CAT, for further notification to the network control facility and/or the alarm monitoring facility.

If the ATM/CAT is being accessed during a time period that is not a "curfew time", the AMP prompts the branch person (step S2) to enter a password for that particular ATM/CAT. The AMP compares this password to its internally stored password. If the password entered is incorrect, a time delay is initiated, and the branch person must wait out this time delay before being allowed to re-enter the password. After some pre-determined number of incorrect entries, an alert is presented to the ATM/CAT Controller Module 502 for further notification to the network control facility and/or the alarm monitoring facility.

If the branch person enters the correct password, the AMP display a "ENTER COMBINATION" screen (step S3), prompting the branch person to enter the combination for the lock. The AMP 109 then transmits this entered combination to the lock inside the security chest (step S4). The lock then notifies the AMP 109 of whether the entered combination was accepted or rejected. For security, the AMP 109 data regarding the correct combination is never saved within the AMP 109.

If the AMP 109 receives a response from the electronic lock that the entered combination is incorrect, a time delay is initiated, and the branch person must wait out this time delay before being allowed to re-enter the combination. Also, after some predetermined number of incorrect entries, an alert is presented to the ATM/CAT Controller Module 502, for further notification to the network control facility and/or the alarm monitoring facility.

If the entered combination is correct, the electronic lock releases a bolt, allowing the door to be opened, as described above. A screen on the AMP 109 indicates that the security chest door has been unlocked, and may now be opened.

In an embodiment of the present invention, the AMP 109 uses an LCD display. In one embodiment, the display is a monochrome LCD panel, with 640 by 480 pixel resolution. Large prompt messages on this display serve to speed up the password-and-combination-entry sequence and reduce the chance of entry errors. This entry sequence can be performed in about four seconds, compared to 30 seconds or longer needed to dial in a combination on a conventional ATM/CAT safe lock with mechanical dial. This reduction in time required to open the safe encourages compliance with a policy of keeping the chest locked at all times.

In addition to the "SECURITY CHEST ACCESS" function, the improved AMP display is also used to streamline ATM/CAT status inquiries, diagnostics, and ATM/CAT Administration functions.

In an embodiment of the present invention, the AMP 109 will use a serial interface for communication with the electronic lock 409. Data sent to the lock 409 is encrypted using an encryption key that is maintained by both the AMP 109 and the electronic lock 409. The trial lock combination that is entered on the AMP keypad by the branch person is encrypted by the AMP 109 and can only be decoded by the electronic lock 409.

The encryption function is dynamic, changing with every new transmission of the combination to the electronic lock 409, including every time the lock 409 is accessed. Thus, even if someone monitored the AMP 109 transmission to the electronic lock 409 and could later reproduce this transmission (such as by using a surrogate AMP), they still could not gain access to the ATM/CAT.

One of skill in the art would appreciate that other forms of encryption could be readily used including public key cryptosystems.

In another embodiment, the AMP 109 has an internal real-time clock that is used to determine when chest access is to be denied. This is referred to as the "curfew time". The AMP 109 does not make any transmissions to the electronic lock 409 during this time.

Also, this internal real-time clock is used to impose a time delay following any attempts to access the electronic lock with an incorrect password entry or incorrect lock combination entry.

As a convenience to some businesses, in another embodiment of the present invention, a time-limited dual-lock function is implemented. In this embodiment, a supervisor enters one password, valid for, say, twenty minutes. Other personnel are then temporarily able to enter the combination to gain access. After twenty minutes, the supervisor must re-enter the password, to enable another entry of the combination.

The password used by the AMP 109 may be changed by a supervisor using a supervisory control function built into the AMP 109. To access the supervisory control function, the AMP 109 requires authorization via a command from the ATM/CAT Controller Module 502. A supervisory application function in the ATM/CAT application provides the needed authorization.

In an embodiment of the present invention, the area in front of the ATM/CAT is monitored by a video camera 103, that is mounted inside the ATM/CAT. This camera 103 is concealed behind a one-way mirror located at eye level on the front panel of the ATM/CAT. This camera's field of view 107 provides for a clear view of the face of the customer that is currently using the ATM/CAT.

The mirror also allows customers using the ATM/CAT to see activity behind them. In one embodiment, the video camera uses a ⅓ inch CCD, and has a 4 mm, f 1.8 lens.

In this embodiment, the output signal from the camera 103 complies with EIA RS-170, a standard interface for security video equipment. An embodiment of the present invention includes the use of a video cassette recorder with time-lapse capability. This recorder is then capable of providing a history of activity in front of the ATM/CAT. Also, in another embodiment, specific events trigger the recorder, such as a card dip, cash being dispensed, and other selected transactions.

In one embodiment, the video cassette recorder is equipped with remote-control capability via an RS-232 input. A serial port connection is made available at the top of the ATM/CAT to provide transaction data, such as account number, time, date, and amount, to a VCR that is capable of overlaying this data over the captured video image of the customer performing the transaction. A command from the ATM/CAT to the VCR could be used to initiate continuous, or stop-motion, recording.

One of skill in the art would readily appreciate that there are many other embodiments of this invention made with other video camera devices and video recording devices which do not have the same characteristics as those disclosed above. Any device capable of viewing and recording a video image would be sufficient for the purposes of the present invention.

In another embodiment of the present invention, the video camera output signal is monitored by a video motion detector. This unit is installed inside the ATM/CAT. When a person moves into the field of view of the camera, such that their initial presence is detected, the ATM/CAT "awakens" by starting to blink the indicator light that is associated with the card reader, beckoning a potential user to dip his or her card. Also, the ATM/CAT brightens its Customer Display.

Implementing this feature results in increased display life, and saves the cost of energy needed to drive the display when the ATM/CAT is Up but not In Use (Idle state).

In one embodiment, the ATM/CAT plays a video or audio welcome message when an approaching customer is detected.

In one embodiment, the ATM/CAT immediately enables the touch screen for the customer, for no-card-required applications.

Because the security camera 103 in the ATM/CAT is concealed behind a one-way mirror, the detection of approaching customers is made without any part of the detector being visible to customers. By maintaining an uncluttered front panel area, with the detector mechanism not visible to customers, the risk of damage from the vandalism is reduced.

The video motion detector is programmable as to its sensitivity and directionality. This feature helps reduce the chance of someone just walking by the front of the ATM/CAT window from being detected. Also, for ATM/CAT installations where the ATM/CAT faces an outside window, this ability to predetermine the detector's direction of sensitivity reduces the risk of outside motion, such as a passing car's headlights, from causing a false detection.

In another embodiment of the present invention, a Passive Infrared (PIR) detector 104 is provided on the ATM/CAT, and installed just below the rear door of the ATM/CAT. Anyone approaching the rear door of the ATM/CAT within the field of detection 106 will be detected by this device, and the device will turn on a red light imbedded in the device housing.

A detection made by the PIR detector 104 is not reported to the alarm monitoring service during non-curfew hours. Branch personnel may move freely around the ATM/CAT-room, without fear of an alarm condition occurring. However, the red light coming on, as a person approaches the ATM/CAT, serves as a silent deterrent. It warns anyone who approaches that any future attempt to approach the ATM/CAT during curfew hours will result in detection and an alarm condition.

During curfew hours, this area behind the ATM/CAT is monitored by the Passive Infrared (PIR) detector 104, such that anyone approaching the rear of the ATM/CAT will cause an alarm condition (monitoring service receives alarm signal).

A spotlight 102, and a loudspeaker 101 announcing a pre-recorded message are controlled by relay contacts provided on the Security Controller Module 501 below, which is in turn controlled by the PIR detector 104 in the rear of the ATM/CAT 100. The Security Controller Module 501 causes the spotlight 102 and loudspeaker 101 to be turned on if the PIR detector 104 detects anyone during curfew hours. The pre-recorded message provided via the loudspeaker 101 is to be directed to both customers in front of the ATM/CAT, and the detected attacker at the rear of the ATM/CAT, instructing all persons to leave immediately.

The Security Controller Module 501 is a circuit board mounted in a housing on the inside surface of the security chest door. In one embodiment of the present invention, the Security Controller Module 501 consists of a Siemens 80535 microprocessor, and interface electronics for all of the security-related sensors described in the present invention. In other embodiments, the Security Controller Module 501 could be made using another commercially available microprocessor.

When monitoring the impact sensors on the security chest door, the Security Controller Module uses a reference profile of the likely sensor output that occurs during a severe impact, as would occur during a hammer attack on the door. Sensor outputs that are sever enough, and are of a characteristic duration and rate of repetition, will result in an alarm condition. This prevents false alarms from events such as a cassette being accidentally knocked against the chest door.

Power for the Security Controller Module is provided from the ATM/CAT's internal +28 Volt power supply, which is designed to provide battery-backed-up power. In the event of a loss of AC power, the ATM/CAT will continue to provide power for the Security Controller Module, and the security-related sensors, for up to 24 hours. To meet this requirement, the battery in the ATM/CAT needs to be at a fully-charged state, meaning that there must not have been an earlier loss of power that has already drained the battery.

In the event of a loss of battery power, the Security Module Controller activates an alarm condition.

The present invention of an advanced security system for ATM/CATs is based on a strategy of lines-of-defense against attack on the security chest. This strategy provides for the most effective security measures to be provided at the innermost point of desired protection, i.e., the inside of the security chest. Various lines of defense against attack extend outward from the inside of the security chest. The defense become less rigorous as these lines of defense extend outward, as is required to allow normal day-to-day servicing and replenishment of the ATM/CAT by authorized branch personnel.

The first line of defense occurs at the door of the ATM/CAT-room. This door is to be equipped with the following devices: an electronic door lock installed on the ATM/CAT-room door, and an emergency override of this lock, as mandated by local building codes.

First, we consider non-curfew hours. This is the time when branch personnel may enter the ATM/CAT room, and authorized personnel may open the security chest door. An electronic lock on the door 108 of the ATM/CAT room requires entry of the correct combination to open the door. Individual businesses may implement any of the following: a hostage-alarm function, multiple-combination functions to give different employees different combinations, or a time-delay lock-out function if several attempts to enter are made in succession with incorrect combinations.

Next, we consider curfew hours. This is the time when no one is allowed to enter the ATM/CAT Room. The electronic lock on the ATM/CAT Room door 108 does not open during curfew hours. Whenever the door is opened, using the emergency override feature, an alarm signal is sent to the alarm monitoring service.

The second line of defense involves the area immediately behind the ATM/CAT. During curfew hours this area is to be protected by the Passive Infrared (PIR) detector 104 (described above), such that anyone approaching the rear of the ATM/CAT will cause an alarm condition.

The lights 102 and loudspeaker 101 announcing a pre-recorded message, are turned on if this PIR detector 104 detects anyone during curfew hours. The prerecorded message is to be directed to both customers in front of the ATM/CAT, and the detected attacker at the rear of the ATM/CAT, instructing all persons to leave immediately.

The third line of defense is the security chest door impact sensor panel 404. This defense is active during both curfew, and non-curfew hours.

An alarm condition will result in an alarm message being sent to the alarm monitor. An alarm condition occurs if the impact sensors detect an impact that is more consistent with a physical attack, than with an accidental impact of a heavy object against the security chest door 105.

The fourth line of defense is the security chest door boltwork. When closed, the door has no discontinuities all the way around the door jam, offering no clue as to the location of the door latching bars 403, or hinges 201. The boltwork, and other security features on the door, are described above.

A sensor on the door indicates if the door is open, or closed. A sensor on the latching bars assembly indicates if this bolt is in the locked, or unlocked, position. The conventional security-related components found in current ATM/CATs are the thermal sensor and seismic sensor. Both of these are located on the door. The thermal sensor and seismic sensor work in conjunction to detect when a predictable attack tool, such as a diamond-head drill, hydraulic pressure tool, oxygen torch, or explosives is being used.

During non-curfew hours, the latching bar position sensor, and the door open/closed sensor, are monitored. An alarm condition is reported if the security chest door remains open, or unbolted, for more than a predetermined period of time.

In one embodiment, a business may override this time if extensive time is required for ATM/CAT servicing under predetermined conditions. An alarm condition is reported if the thermal sensor or the seismic sensor are activated.

During curfew hours, an alarm condition is reported if the door is ever unbolted, or opened, during curfew hours. An alarm condition is reported if the thermal sensor or the seismic sensor are activated.

The fifth line of defense is the glass plate 408 installed across the inside surface of the security chest door 105. If an attacker drills through the chest door 105, breaking the glass, the latching bars 403 would be jammed in the closed position, preventing the door form opening.

For most ATM/CAT installations, there are no curfew hours in front of the ATM/CAT. Customers, branch personnel, maintenance personnel, security personnel, and contracted service-provider personnel may move freely in front of the ATM/CAT.

During a transaction, a business may choose to connect the video signal from the camera to a video cassette recorder (VCR), to capture an image of the person conducting the transaction on videotape.

The detection of an approaching customer does not set an alarm condition. In another embodiment, an alarm condition is initiated if someone is detected in front of the ATM/CAT during non-business hours, and no transaction or ATM/CAT administrative function has been initiated for several minutes, and the person continues to be detected.

Embodiments of the present invention have now been described in fulfillment of the above objects. It will be appreciated that these examples are merely illustrative of the invention. Many variations and modifications will be apparent to those skilled in the art.

What is claimed is:

1. An enhanced-security automated teller machine, comprising:

a security chest made of a theft-deterrent material, the security chest having at least one open side;

a door member made of a theft-deterrent material, the door member sized so as to close the at least one open side;

a boltwork module;

an electronic lock mounted on the door member such that the electronic lock is not visible from the outside of the security chest, wherein the electronic lock is mounted in a random location on the door member such that an exact position of the electronic lock cannot be determined from outside of the security chest, wherein the electronic lock is operable to release a bolt when a correct combination is received, wherein the electronic lock is operatively coupled to a network, and wherein the correct combination is received from the network;

a controller device; and a maintenance panel;

wherein the electronic lock is operatively coupled to a secondary interface, and wherein the correct combination can only be received from the network, after a correct password is received by the maintenance panel.

2. The machine of claim 1, wherein the theft-deterrent material comprises steel.

3. The machine of claim 1, wherein the theft-deterrent material comprises a composite material.

4. The machine of claim 3, wherein the composite material includes a polymer, aluminum oxide, and an elastomeric alloy.

5. The machine of claim 1, wherein the door is attached to the security chest by a hinge.

6. The machine of claim 5, wherein the hinge has a first pivot point and a second pivot point.

7. The machine of claim 6, wherein the door member is opened by pivoting at the first pivot point to pull the door perpendicularly away from the open side, and pivoting at the second pivot point to provide access to the security chest through the open side.

8. The machine of claim 6, wherein the hinge is a crane hinge.

9. The machine of claim 1, wherein the boltwork module includes a first latching bar and a second latching bar engageable to lock the door member.

10. The machine of claim 9, wherein the first latching bar and the second latching bar are configured to prevent the door member from being opened by removing the hinge.

11. The machine of claim 10, further comprising a control dial operable to engage and disengage the boltwork mechanism.

12. The machine of claim 1, wherein the correct combination received from the network is only valid for a predetermined period of time.

13. The machine of claim 12, wherein the predetermined period of time is of a short duration, such that the correct combination may not be captured and used at a later time to open the safe.

14. The machine of claim 1, wherein the maintenance panel includes a display screen and a data entry device.

15. The machine of claim 14, wherein the display screen is a flat panel liquid crystal diode display.

16. The machine of claim 14, wherein the data entry device is a numeric keypad.

17. The machine of claim 1, wherein the door member includes a glass plate, sensors, and a plastic protective panel.

18. The machine of claim 17, wherein the breaking of glass plate jams the latching bars to prevent the door member from opening.

19. The machine of claim 17, wherein the sensors include at least one selected from the group consisting of: a door open/close sensor, a bolt lock sensor, a thermal sensor, a seismic sensor, an impact detection sensor, a passive infrared detector, a video camera device, and a motion detector device.

20. The machine of claim 1, wherein the controller device includes a security controller module, and an automated teller machine controller module.

21. The machine of claim 20, wherein the network comprises an automated teller machine/customer activated terminal (ATM/CAT) network.

22. The machine of claim 20, wherein the correct combination received from the network is requestable via a telephone call.

23. The machine of claim 20, wherein the correct combination received from the network is requestable from the maintenance panel.

24. The machine of claim 20, further comprising at least one security sensor in communication with the security controller module, the at least one security sensor outputting sensor data to the security controller module, wherein the security controller module further comprises reference data determinative of a security incident, the security controller module further operable to signal an alarm condition based on a comparison of the sensor data with the reference data.

25. The machine of claim 20, wherein the at least one sensor is selected from the group consisting of a door open/close sensor, a bolt lock sensor, a thermal sensor, a seismic sensor, an impact detection sensor, a passive infrared sensor, a video camera device, and a motion detector sensor.

26. The machine of claim 24, wherein the at least one sensor is an impact detection sensor.

27. The machine of claim 24, further comprising a spotlight, a loudspeaker and a prerecorded message, wherein the security controller module is operable to turn on the spotlight and play the prerecorded message through the loudspeaker when the alarm condition is detected.

28. The machine of claim 27, further comprising a plurality of security sensors in communication with the security controller module, the plurality of security sensors each outputting sensor data to the security controller module, wherein the security controller module further comprises reference data determinative of a security incident, the security controller module further operable to signal an alarm condition based on a comparison of at least one of the plurality of sensor data with the reference data.

29. The machine of claim 28, wherein the plurality of sensors include at least two sensors selected from the group consisting of a door open/close sensor, a bolt lock sensor, a thermal sensor, a seismic sensor, an impact detection sensor, a passive infrared sensor, a video camera device, and a motion detector sensor.

30. The machine of claim 28, wherein the at least one of the plurality of sensor data includes sensor data from an impact detection sensor.

31. The machine of claim 28, further comprising a spotlight, a loudspeaker and a prerecorded message, wherein the security controller module is operable to turn on the spotlight and play the prerecorded message through the loudspeaker when the alarm condition is detected.

32. An enhanced-security automated teller machine, comprising:

a security chest made of a theft-deterrent material, the security chest having at least one open side;

a door member made of a theft-deterrent material, the door member sized so as to close the at least one open side;

a boltwork module;

a controller device;

a maintenance panel; and an electronic lock mounted on the door member such that the electronic lock is not visible from the outside of the security chest, wherein the electronic lock is mounted in a random location on the door member such that an exact position of the electronic lock cannot be determined from outside of the security chest, wherein the electronic lock is operable to release a bolt when a correct combination is received, wherein the electronic lock is operatively coupled to a secondary interface, and wherein the correct combination is received from the secondary interface, the secondary interface being located in a hidden location, such that an external device may be attached to the secondary interface to receive the correct combination even if the maintenance panel is damaged.

33. The machine of claim 32, wherein the electronic lock is operatively coupled to the maintenance panel, and wherein the correct combination is receivable from the maintenance panel.

34. The machine of claim 32, wherein the electronic lock is operatively coupled to a network, and wherein the correct combination is receivable from the network.

35. The machine of claim 34, wherein the network comprises an automated teller machine/customer activated terminal (ATM/CAT) network.

36. The machine of claim 34, wherein the correct combination received from the network is requestable via a telephone call.

37. The machine of claim 34, wherein the correct combination received from the network is requestable from the maintenance panel.

38. The machine of claim 32, wherein the controller device further comprises a security controller module, and further comprising at least one security sensor in communication with the security controller module, the at least one security sensor outputting sensor data to the security controller module, wherein the security controller module further comprises reference data determinative of a security incident, the security controller module further operable to signal an alarm condition based on a comparison of the sensor data with the reference data.

39. The machine of claim 38, wherein the at least one sensor is selected from the group consisting of a door open/close sensor, a bolt lock sensor, a thermal sensor, a seismic sensor, an impact detection sensor, a passive infrared sensor, a video camera device, and a motion detector sensor.

40. The machine of claim 39, further comprising a spotlight, a loudspeaker and a prerecorded message, wherein the security controller module is operable to turn on the spotlight and play the prerecorded message through the loudspeaker when the alarm condition is detected.

41. The machine of claim 33, wherein the at least one sensor is an impact detection sensor.

42. The machine of claim 32, wherein the controller device further comprises a security controller module, and further comprising a plurality of security sensors in communication with the security controller module, the plurality of security sensors each outputting sensor data to the security controller module, wherein the security controller module further comprises reference data determinative of a security incident, the security controller module further operable to signal an alarm condition based on a comparison of at least one of the plurality of sensor data with the reference data.

43. The machine of claim 42, wherein the plurality of sensors include at least two sensors selected from the group consisting of a door open/close sensor, a bolt lock sensor, a thermal sensor, a seismic sensor, an impact detection sensor, a passive infrared sensor, a video camera device, and a motion detector sensor.

44. The machine of claim 42, wherein the at least one of the plurality of sensor data includes sensor data from an impact detection sensor.

45. The machine of claim 42, further comprising a spotlight, a loudspeaker and a prerecorded message, wherein the security controller module is operable to turn on the spotlight and play the prerecorded message through the loudspeaker when the alarm condition is detected.

46. An enhanced-security automated teller machine, comprising:

a security chest made of a theft-deterrent material, the security chest having at least one open side;

a door member made of a theft-deterrent material, the door member sized so as to close the at least one open side;

a boltwork module;

a controller device comprising a security controller module;

a plurality of security sensors in communication with the security controller module, the plurality of security sensors each outputting sensor data to the security controller module, wherein the security controller module further comprises reference data determinative of a security incident, the security controller module further operable to signal an alarm condition based on a comparison of at least one of the plurality of sensor data with the reference data;

a maintenance panel; and an electronic lock mounted on the door member such that the electronic lock is not visible from the outside of the security chest, wherein the electronic lock is mounted in a random location on the door member such that an exact position of the electronic lock cannot be determined from outside of the security chest, wherein the electronic lock is operable to release a bolt when a correct combination is received, wherein the electronic lock is operatively coupled to a secondary interface, and wherein the correct combination is received from the secondary interface, the secondary interface being located in a hidden location, such that an external device may be attached to the secondary interface to receive the correct combination even if the maintenance panel is damaged.

47. The machine of claim 46, wherein the electronic lock is operatively coupled to the maintenance panel, and wherein the correct combination is receivable from the maintenance panel.

48. The machine of claim 46, wherein the electronic lock is operatively coupled to a network, and wherein the correct combination is receivable from the network.

49. The machine of claim 48, wherein the network comprises an automated teller machine/customer activated terminal (ATM/CAT) network.

50. The machine of claim 46, wherein the plurality of sensors include at least two sensors selected from the group consisting of a door open/close sensor, a bolt lock sensor, a thermal sensor, a seismic sensor, an impact detection sensor, a passive infrared sensor, a video camera device, and a motion detector sensor.

51. The machine of claim 50, wherein the at least one of the plurality of sensor data includes sensor data from an impact detection sensor.

52. The machine of claim 50, further comprising a spotlight, a loudspeaker and a prerecorded message, wherein the security controller module is operable to turn on the spotlight and play the prerecorded message through the loudspeaker when the alarm condition is detected.

53. An enhanced-security automated teller machine, comprising:

a security chest made of a theft-deterrent material, the security chest having at least one open side;

a door member made of a theft-deterrent material, the door member sized so as to close the at least one open side, the door member having an open position and a closed position;

a boltwork module including a latching mechanism having a locked position and an unlocked position, wherein the door member is securable in the closed position when the latching mechanism is in the locked position;

an electronic lock mounted on the door member in a predetermined location and coupled to the boltwork module, the electronic lock having a predetermined combination such that latching mechanism is movable to the unlocked position upon receipt of the predetermined combination;

a maintenance panel; and a predetermined input mechanism coupled to the electronic lock, the predetermined combination transmittable to the electronic lock via the predetermined input mechanism, wherein the predetermined input mechanism comprises at least one of a secondary interface and a network;

wherein the predetermined combination can be received from the network, after a correct password is received by the maintenance panel.

54. The machine of claim 53, wherein the network comprises an automated teller machine/customer activated terminal (ATM/CAT) network.

55. The machine of claim 53, wherein the predetermined combination transmittable via the network is requestable via a telephone call.

56. The machine of claim 53, further comprising a primary input device coupled to both the electronic lock and the network, wherein the predetermined combination transmittable via the network is requestable from the primary input device.

57. The machine of claim 56, wherein the primary input device comprises a maintenance panel.

58. The machine of claim 53, further comprising a security controller module and a plurality of security sensors, the plurality of security sensors in communication with the security controller module and each outputting sensor data to the security controller module, wherein the security controller module further comprises reference data determinative of a security incident, the security controller module further operable to signal an alarm condition based on a comparison of at least one of the plurality of sensor data with the reference data.

59. The machine of claim 58, wherein the plurality of sensors include at least two sensors selected from the group consisting of a door open/close sensor, a bolt lock sensor, a thermal sensor, a seismic sensor, an impact detection sensor, a passive infrared sensor, a video camera device, and a motion detector sensor.

60. The machine of claim 58, wherein the at least one of the plurality of sensor data includes sensor data from an impact detection sensor.

61. The machine of claim 58, further comprising a spotlight, a loudspeaker and a prerecorded message, wherein the security controller module is operable to turn on the spotlight and play the prerecorded message through the loudspeaker when the alarm condition is detected.

62. The machine of claim 53, wherein the predetermined location of the electronic lock is randomly selectable from a plurality of redefined positions.

63. An enhanced-security automated teller machine, comprising:

a security chest made of a theft-deterrent material, the security chest having at least one open side;

a door member made of a theft-deterrent material, the door member sized so as to close the at least one open side;

a boltwork module;

an electronic lock mounted on the door member such that the electronic lock is not visible from the outside of the security chest, wherein the electronic lock is mounted in a random location on the door member such that an exact position of the electronic lock cannot be determined from outside of the security chest, wherein the electronic lock is operable to release a bolt when a correct combination is received, wherein the electronic lock is operatively coupled to a network, and wherein the correct combination is received from the network;

a controller device; and a maintenance panel;

wherein the electronic lock is operatively coupled to the maintenance panel, and wherein the correct combination is received from the maintenance panel.

* * * * *